(12) United States Patent
Liao

(10) Patent No.: US 7,669,025 B2
(45) Date of Patent: Feb. 23, 2010

(54) APPARATUS FOR SECURITY OF ACCESSING DATA AND METHOD OF THE SAME

(75) Inventor: Chun-Yao Liao, Hsinchu (TW)

(73) Assignee: Holtek Semiconductor Inc., Hsinchu (TW)

( * ) Notice: Subject to any disclaimer, the term of this patent is extended or adjusted under 35 U.S.C. 154(b) by 331 days.

(21) Appl. No.: 11/757,525

(22) Filed: Jun. 4, 2007

(65) Prior Publication Data

US 2008/0183998 A1      Jul. 31, 2008

(30) Foreign Application Priority Data

Jan. 26, 2007   (TW) .............................. 96102945 A

(51) Int. Cl.
*G06F 12/00*      (2006.01)
(52) U.S. Cl. .................. 711/163; 711/103; 711/164; 711/E12.092; 711/E12.094
(58) Field of Classification Search ............... 711/ E12.092–E12.094
See application file for complete search history.

(56) References Cited

U.S. PATENT DOCUMENTS

| 4,506,329 | A | | 3/1985 | Duwel et al. | |
|---|---|---|---|---|---|
| 5,408,629 | A | * | 4/1995 | Tsuchiya et al. | 711/151 |
| 6,615,324 | B1 | * | 9/2003 | Fernald | 711/153 |
| 7,284,106 | B1 | * | 10/2007 | Fernald | 711/163 |
| 2005/0021905 | A1 | * | 1/2005 | Kwon | 711/103 |
| 2005/0066110 | A1 | * | 3/2005 | Raz et al. | 711/103 |
| 2005/0120163 | A1 | * | 6/2005 | Chou et al. | 711/103 |
| 2005/0242924 | A1 | * | 11/2005 | Yosim et al. | 340/5.74 |
| 2006/0101193 | A1 | * | 5/2006 | Murin | 711/103 |

* cited by examiner

*Primary Examiner*—Reginald G Bragdon
*Assistant Examiner*—Arvind Talukdar
(74) *Attorney, Agent, or Firm*—WPAT, PC; Justin King

(57) ABSTRACT

The present invention provides an apparatus for security of accessing data, comprising a storage device including an address transform detector, a first lock bit register and a data comparator, the address transform detector providing a predetermined correction signal, data outputted from the storage device could be correctly identified when a memory address signal matches the predetermined correction signal and a latch signal is provided to the first lock bit register; and a micro-control unit for receiving data outputted from the storage device, the outputted data being stored in a second lock bit register and encoded by a serial encoding unit, a locking signal being feedback to the storage device; wherein a data encoded signal outputted from the first lock bit register and the locking signal are provided to a data comparator for comparison and determining whether output correct data to an encoding control unit according to the comparison.

17 Claims, 3 Drawing Sheets

APPARATUS FOR SECURITY OF ACCESSING DATA AND METHOD OF THE SAME

BACKGROUND OF THE INVENTION

1. Field of the Invention

The invention relates to an apparatus and a method for security of accessing data, and more particularly to a non-volatility memory including one or more security guard for preventing data from access or copy from the non-volatility memory.

2. Description of the Related Art

Generally, people like to store confidential data such as software, computer program or highly confidential document in the non-volatile memory. In order to prevent data from access or copy, several class of protection may be applied to the non-volatile memory. Refer to FIG. 1, it is a functional block diagram of a conventional non-volatile memory. After storing data into the non-volatile memory, validity should be checked and confirmed. So a storage device 11 is used to be a medium for storage. To protect data, it is known as a way to use a lock bit register 121 located in the micro-control unit 12 for storing lock bit information provided by the storage device 11 and prevent accessing a output circuit 13 according to the locking signal 1211 from the lock bit register 121. This way is simple but easy to be broken by destructively changing signal outputted from the lock bit register 121.

BRIEF SUMMARY OF THE INVENTION

To solve the disadvantage of the prior art. The present invention provides an apparatus for security of accessing data and a method for accessing data stored in a non-volatility memory, the non-volatility memory.

The first object of the present invention is to utilize the characteristic of the non-volatility memory, that is, loading data stored in a plurality of information memory block to registers of the micro-control unit (MCU) for setting. Therefore, a self-detection register is added in the non-volatility memory for storing lock bit data of the storage device and comparing the lock bit data with data which is feedback by the lock bit register of the MCU. Meanwhile, the data which is feedback by the MCU is not original but encoded, whereby the information about lock bit is hided. When a lock signal is provided to the lock bit register and is the same as the lock bit data feedback by the MCU, the storage device outputs the correct data, otherwise, outputs data encoded in complicated format.

The second object of the present invention is to replace a single level signal with a serial lock bit data feedback from the MCU. Therefore, it is not possible to access correct data by destructively changing signal outputted form the MCU.

The third object of the present invention is the lock bit register of the MCU could not be accessed when the lock bit signal is enabled. Moreover, a second security guard is comparing the locking signal which is feedback to the storage device with the data encoded signal. When the locking signal is changed by the copier, the output data could be encoded for protection.

To achieve these objects mentioned above, the present invention provides an apparatus for security of accessing data, comprising a storage device including an address transform detector, a first lock bit register and a data comparator, the address transform detector providing a predetermined correction signal, data outputted from the storage device could be correctly identified when a memory address signal matches the predetermined correction signal and a latch signal is provided to the first lock bit register; and a micro-control unit for receiving data outputted from the storage device, the outputted data being stored in a second lock bit register and encoded by a serial encoding unit, a locking signal being feedback to the storage device; wherein a data encoded signal outputted from the first lock bit register and the locking signal are provided to a data comparator for comparison and determining whether output correct data to an encoding control unit according to the comparison.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
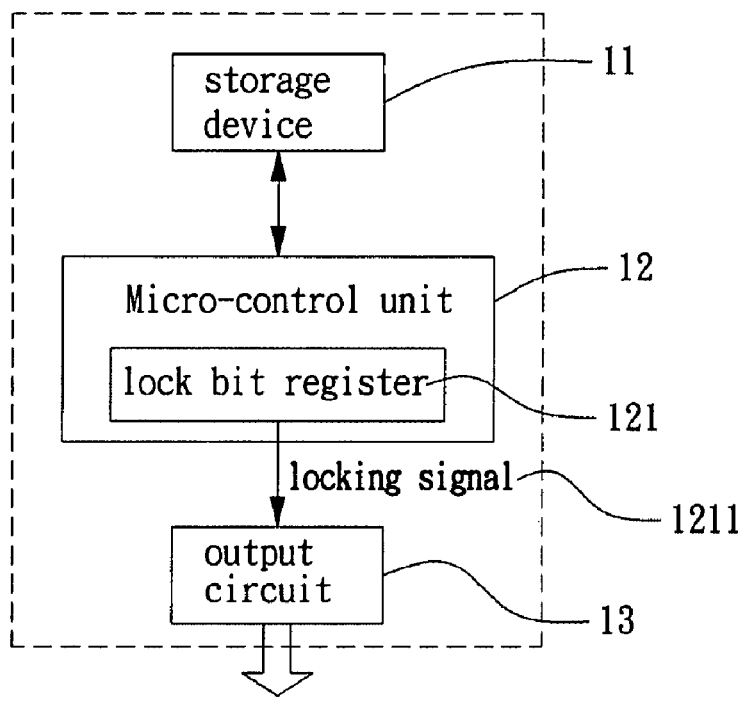
FIG. 1 is a functional block diagram of a conventional non-volatile memory.

Several exemplary embodiments of the invention are described with reference to FIGS. 2 through 5C, which generally relate to an apparatus for security of accessing data. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses an apparatus for security of accessing data and a method for accessing data stored in a non-volatility memory.

Figure 2:
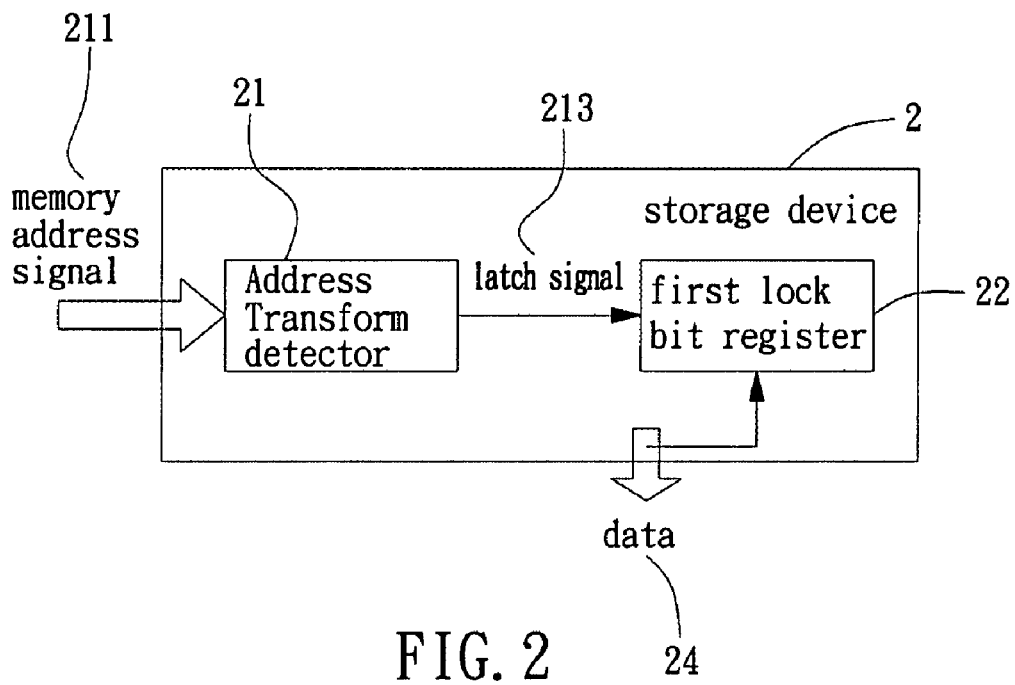
FIG. 2 is a functional block diagram of a storage device of a non-volatile memory according to an embodiment of the present invention.

Referring to FIG. 2, it is a functional block diagram of a storage device of a non-volatile memory according to an embodiment of the present invention.

The address transform detector (ATD) 21 generates a latch signal 213 to the first lock bit register 22 according to the memory address signal 211. The data corresponding to a lock bit address being stored in the first lock bit register 22. Then the data 24 corresponding to a lock bit address also being transferred to a second lock bit register 31 shown in the FIG. 3.

Figure 3:
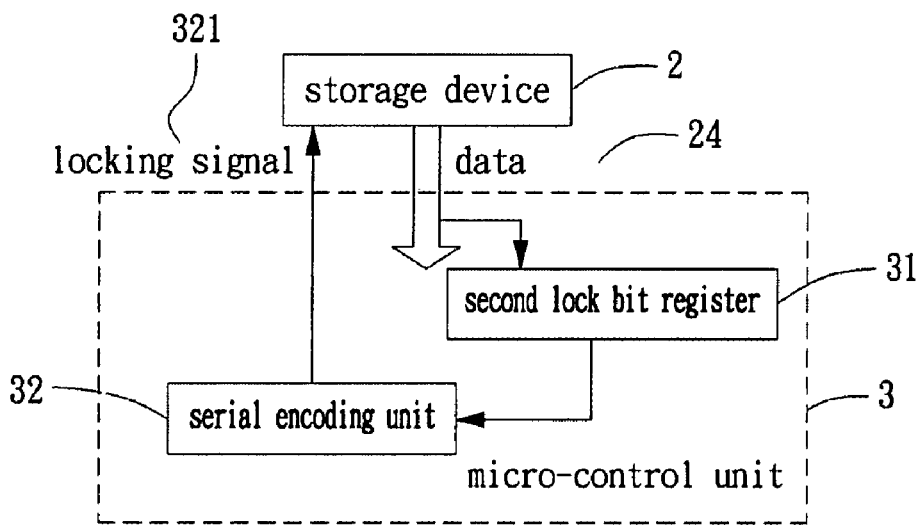
FIG. 3 is a functional block diagram of a micro-control unit of a non-volatile memory according to an embodiment of the present invention.

Referring to FIG. 3, it is a functional block diagram of a micro-control unit of a non-volatile memory according to an embodiment of the present invention.

The micro-control unit 3 comprises a second lock bit register 31 and a serial encoding unit 32. The data 24 corresponding to a lock bit address being stored in the second lock bit register 31 located in the micro-control unit 3. And then, the data 24 being transmitted to the serial encoding unit 32 and encoded to generate a locking signal 321 feedback to the storage device 2. The locking signal 321 could be a serial signal which being compared with the data 24 for determining whether output correct data.

Figure 4:
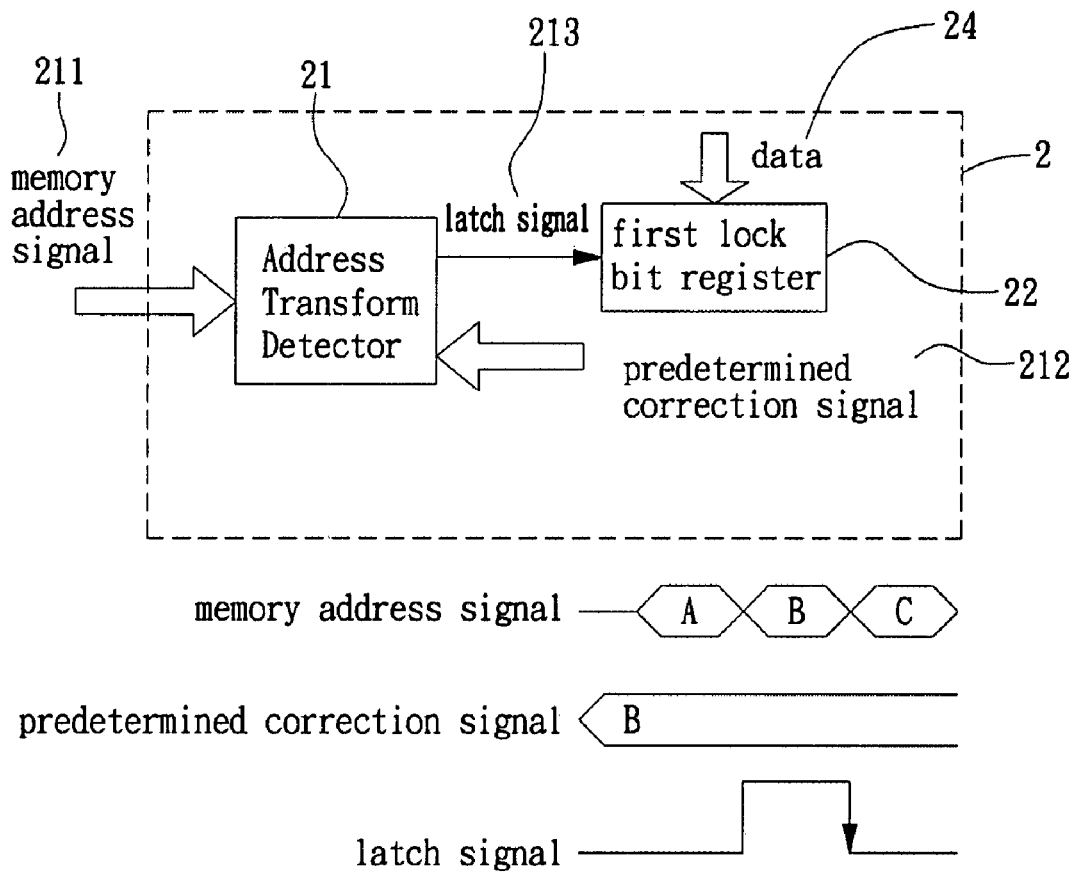
FIG. 4 is a functional block diagram of a storage device of a non-volatile memory comply with a schematic diagram of signals transmitted in the storage device.

Referring to FIG. 4, it is functional block diagram of a storage device of a non-volatile memory comply with a schematic diagram of signals transmitted in the storage device.

The address transform detector 21 generates a latch signal 213 when a memory address signal 211 matches the predetermined correction signal 212. In this embodiment, the predetermined correction signal 212 is the same as B signal of the memory address signal 211. Therefore, the latch signal 213 being low when timing of the memory address signal 211 goes in A signal and C signal, the data 24 could not be transmitted to the first lock bit register 22 in this situation. The latch signal 213 being high when timing of the memory address signal 211 goes in B signal, the data 24 could be transmitted to the first lock bit register 22 in this situation.

Figure 5A:
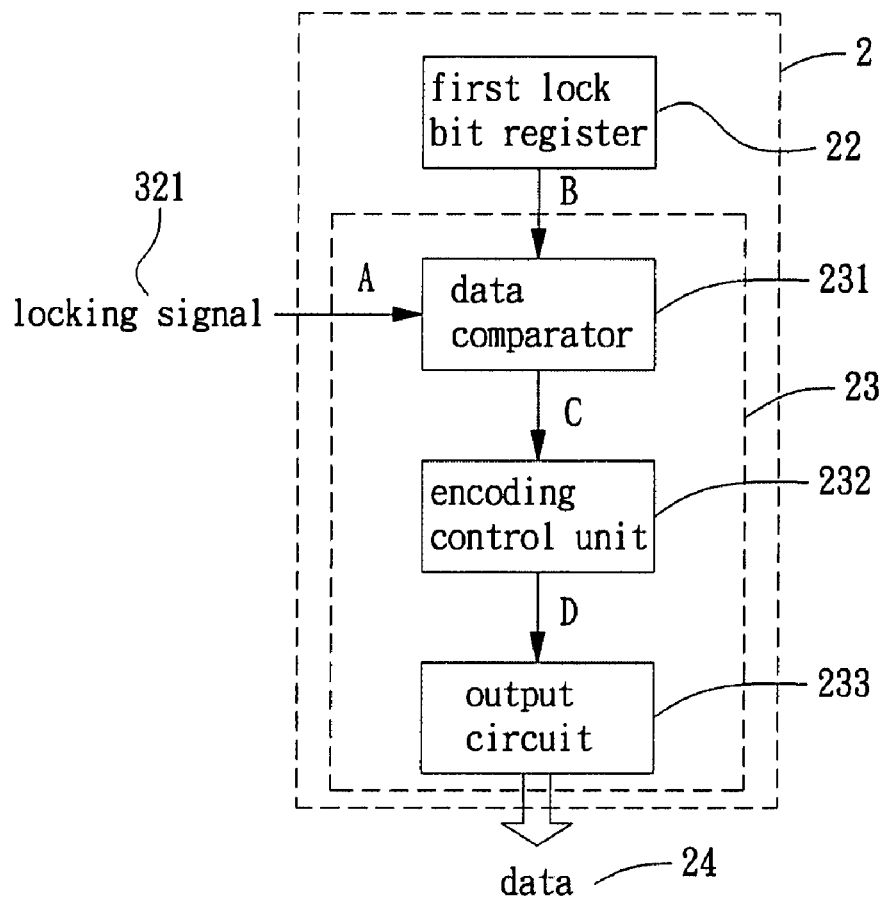
FIG. 5A is a functional block diagram of a storage device of a non-volatile memory according to another embodiment of the present invention.

Referring to FIG. 5A, it is a functional block diagram of a storage device of a non-volatile memory according to another embodiment of the present invention.

The storage device 2 comprises a first lock bit register 22 and a comparing code unit 23. The comparing code unit 23 comprises a data comparator 231, a encoding control unit 232 and a output circuit 233. The locking signal 321 feedback from the MCU 3 being transmitted to the data comparator 231. The locking signal may be a pulse signal as the signal A shown in the FIG. 5B. The signal B is a coded data transmitted from the first lock bit register 22. The signal C (output of the data comparator 231) is changed with the signal A and the signal D (output of the encoding control unit 232) is triggered at the falling edge of the signal C. The signal D goes low and determines the output circuit 233 to output data without encoding. In the other embodiment, FIG. 5C, the signal A (the locking signal 321) goes high from low, the signal B does not change, so the signal C is changed with the signal A. The signal C (output of the data comparator 231) goes high from low and the raising edge of the signal C makes the signal D stay high. Accordingly, the high level of the signal D determines the output circuit 233 to output data with encoding.

Figure 5B:
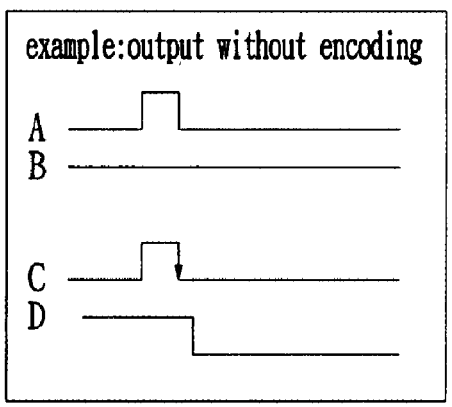
FIG. 5B is a schematic diagram of signals according to an embodiment of the present invention.
Figure 5C:
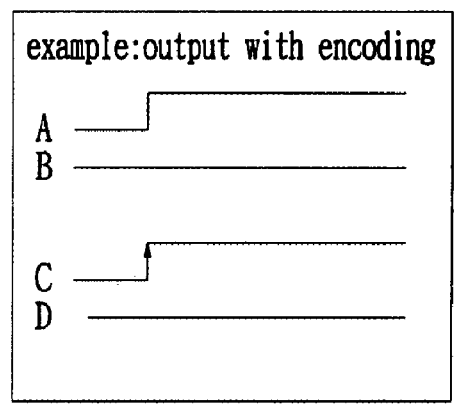
FIG. 5C is a schematic diagram of signals according to another embodiment of the present invention.

From FIG. 5A to 5C, it is noted that utilizing the data comparator 231 to compare data between the storage device 2 and the micro-control unit 3 to determine data whether be changed or not. In one embodiment, a serial encoding unit 32 is also capable of complex encoding, for example, selectively feedback n-bits data to the data comparator 231 of the storage device 2.

In another embodiment, the encoding control unit 232 of the storage device 2 can invert or switch at least two bits of the output of the data comparator 231.

In addition to the first security guard of the storage device 2, the second security guard (generating a locking signal 321 to trigger output encoding) makes copier can not be aware of the encoding output. Thus, the copier may obtain wrong data. Accordingly, the data stored in the non-volatility memory can be safely protected.

Methods and systems of the present disclosure, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An apparatus for security of accessing data and preventing data from access or copy, comprising:
   a storage device including, an address transform detector storing a predetermined correction signal, a first lock bit register and a data comparator, wherein data before being outputted from the storage device is correctly identified and stored in the first lock bit register when a memory address signal which the data corresponds to matches the predetermined correction signal; and
   a micro-control unit comprising a second lock-bit register and a serial encoding unit, for receiving data outputted from the storage device, the outputted data being stored in a second lock bit register and encoded to generate a locking signal by the serial encoding unit, the locking signal being feedback to the storage device and compared with a data encoded signal stored in the first lock bit register, thereby determining whether the storage device outputs the correct data.

2. The apparatus as claimed in claim 1, wherein the address transform detector outputs a latch signal to the first lock bit register when the memory address signal matches the predetermined correction signal.

3. The apparatus as claimed in claim 1, wherein comparison step is performed by the data comparator.

4. The apparatus as claimed in claim 1, wherein the storage device further comprises an encoding control unit for encoding the output of the data comparator.

5. The apparatus as claimed in claim 4, wherein the encoding control unit can invert or switch at least two bits of the output of the data comparator.

6. The apparatus as claimed in claim 4, further comprising an output circuit for outputting the output of the encoding control unit.

7. The apparatus as claimed in claim 1, wherein the locking signal is a serial signal.

8. The apparatus as claimed in claim 7, wherein the locking signal is a pulse signal.

9. An apparatus for security of accessing data and preventing the data from access or copy, comprising:
   a storage device including an address transform detector storing a predetermined correction signal, a first lock bit register and a data comparator, wherein data before being outputted from the storage device is correctly identified and stored in the first lock bit register when a memory address signal which the data corresponds to matches the predetermined correction signal; and a micro-control unit comprising a second lock-bit register and a serial encoding unit, for receiving data outputted from the storage device, the outputted data being stored in a second lock bit register and encoded to generate a locking signal by the serial encoding unit, the locking signal being feedback to the storage device; wherein a data encoded signal outputted from the first lock bit register and the locking signal generated by the serial encoding unit are provided to the data comparator for comparison and determining whether correct data is sent to the encoding control unit.

10. The apparatus as claimed in claim 9, further comprising an output circuit for outputting the output of the encoding control unit.

11. The apparatus as claimed in claim 10, wherein the encoding control unit can invert or switch at least two bits of the output of the data comparator.

12. The memory device as claimed in claim 9, wherein the locking signal is a serial signal.

13. The memory device as claimed in claim 12, wherein the locking signal is a pulse signal.

14. A method for accessing data stored in a non-volatile memory and preventing the data from access or copy, the non-volatile memory including a storage device having an address transform detector, a first lock bit register and a data comparator and a micro-control unit having a second lock bit register and a serial encoding unit, comprising:

providing a predetermined correction signal by the address transform detector;

outputting a latch signal to the first lock bit register when a memory address signal matches the predetermined correction signal and storing in the first lock bit register data to be outputted that corresponds to the memory address signal;

receiving data outputted from the storage device by the second lock bit register;

encoding data outputted from the storage device by the serial encoding unit to feedback a locking signal to the storage device;

outputting a data encoded signal from the first lock bit register; and comparing the locking signal with the data encoded signal to determine whether to output correct data from the non-volatile memory.

15. The method for accessing data as claimed in claim 14, wherein the storage device further comprises an encoding control unit for encoding the output of the data comparator.

16. The method for accessing data as claimed in claim 14, wherein the locking signal is a serial signal.

17. The method for accessing data as claimed in claim 16, wherein the locking signal is a pulse signal.

* * * * *